US012717719B2

(12) United States Patent
Labonte et al.

(10) Patent No.: US 12,717,719 B2
(45) Date of Patent: Aug. 25, 2026

(54) SYSTEM AND METHOD FOR CACHE MANAGEMENT

(71) Applicant: Samsung Electronics Co., Ltd., Suwon-si (KR)

(72) Inventors: Thomas Labonte, Marlborough, MA (US); Samantika Sury, Westford, MA (US); Douglas Joseph, Austin, TX (US); Alan Gara, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/967,595

(22) Filed: Dec. 3, 2024

(65) Prior Publication Data

US 2025/0363053 A1 Nov. 27, 2025

Related U.S. Application Data

(60) Provisional application No. 63/650,775, filed on May 22, 2024.

(51) Int. Cl.
*G06F 12/08* (2016.01)
*G06F 12/0811* (2016.01)

(52) U.S. Cl.
CPC ................................ *G06F 12/0811* (2013.01)

(58) Field of Classification Search
CPC ...... G06F 12/02; G06F 12/08; G06F 12/0811; G06F 12/0806; G06F 12/0824; G06F 12/084; G06F 12/0886; G06F 12/0891; G06F 2212/1008; G06F 2212/1024; G06F 2212/1016; G06F 2212/604; G06F 3/06; G06F 3/0604; G06F 3/0658
See application file for complete search history.

(56) References Cited

U.S. PATENT DOCUMENTS 5,822,763 A 10/1998 Baylor et al.
6,141,733 A 10/2000 Arimilli et al.
(Continued)

FOREIGN PATENT DOCUMENTS

EP 3486787 A1 * 5/2019 .......... G06F 12/128
EP 3572946 A1 * 11/2019 .......... G06F 12/128

OTHER PUBLICATIONS

Anderson, C. et al., “Design and Evaluation of a Subblock Cache Coherence Protocol for Bus-Based Multiprocessors”, May 11, 1994, 23 pages, Paul G. Allen School of Computer Science & Engineering, University of Washington, https://dada.cs.washington.edu/research/tr/1994/05/UW-CSE-94-05-02.pdf.
(Continued)

*Primary Examiner* — Pierre Michel Bataille
(74) *Attorney, Agent, or Firm* — Womble Bond Dickinson (US) LLP

(57) ABSTRACT

A system and method for cache management. In some embodiments, a system includes: a lower-level cache; a first upper-level cache; and a second upper-level cache, the lower-level cache, the first upper-level cache, and the second upper-level cache being configured: to store first metadata of a cache line, in the first upper-level cache, the first metadata indicating that the cache line is in a partial state, the partial state indicating that at least two words in the cache line are in different permission states.

20 Claims, 8 Drawing Sheets

(56) References Cited

U.S. PATENT DOCUMENTS

| | | | | |
|---|---|---|---|---|
| 7,698,508 | B2 * | 4/2010 | Rajamony | G06F 12/0897 711/143 |
| 8,131,944 | B2 | 3/2012 | Fang et al. | |
| 10,402,331 | B2 * | 9/2019 | Hagersten | G06F 12/084 |
| 11,036,648 | B2 | 6/2021 | Anderson et al. | |
| 11,397,677 | B2 | 7/2022 | Sherlock et al. | |
| 2010/0180084 | A1 * | 7/2010 | Cypher | G06F 12/084 711/135 |
| 2011/0161588 | A1 * | 6/2011 | Guthrie | G06F 12/0811 711/E12.024 |
| 2013/0311724 | A1 * | 11/2013 | Walker | G06F 12/0811 711/E12.071 |
| 2016/0055100 | A1 * | 2/2016 | Loh | G06F 12/128 711/122 |
| 2017/0220499 | A1 | 8/2017 | Gray | |
| 2018/0260325 | A1 | 9/2018 | Doshi et al. | |
| 2019/0155733 | A1 * | 5/2019 | Hagersten | G06F 12/0806 |
| 2020/0201766 | A1 * | 6/2020 | Williams | G06F 12/0833 |
| 2020/0250098 | A1 | 8/2020 | Ma et al. | |

OTHER PUBLICATIONS

Anderson, C. et al., "Two techniques for improving performance on bus-based multiprocessors", Future Generation Computer Systems, 1995, pp. 537-551, vol. 11, Elsevier Science B.V, https://www.sciencedirect.com/science/article/pii/0167739X9500023L/pdf?md5=64ddd543efeb67004a1a12a2b2a2beee&pid=1-s2.0-0167739X9500023L-main.pdf.

Chen, Y.-S. et al., "Cache Protocols with Partial Block Invalidations", 1993, pp. 16-23, IEEE, https://ieeexplore.ieee.org/stamp/stamp.jsp?arnumber=262850.

Rothman, J. B. et al., "Minerva: An Adaptive Subblock Coherence Protocol for Improved SMP Performance", Report No. UCB/CSD-99-1087, Dec. 1999, 27 pages, Computer Science Division (EECS), University of California Berkeley, https://digitalassets.lib.berkeley.edu/techreports/ucb/text/CSD-99-1087.pdf.

Rothman, J. B. et al., "Sector Cache Design and Performance", Report No. UCB/CSD-99-1034, Jan. 1999, 63 pages, Computer Science Division (EECS), University of California Berkeley, https://www2.eecs.berkeley.edu/Pubs/TechRpts/1999/CSD-99-1034.pdf.

Tomašević, M. et al., "The word-invalidate cache coherence protocol", Microprocessors and Microsystems, 1996, pp. 3-16, Elsevier Science B.V, https://www.sciencedirect.com/science/article/pii/0141933195010602/pdf?md5=3c860fcfbc970f4c5e0bff7ff3473003&pid=1-s2.0-0141933195010602-main.pdf.

Zhao, et al. "Protozoa: Adaptive Granularity Cache Coherence," ACM, 2013, 12 pages.

Liu, et al. "Adaptive Coherence Granularity for Multi-Socket Systems," IEEE Transactions on Computers, vol. 66, No. 8, Aug. 2017, 11 pages.

Alsop, et al. "Spandex: A Flexible Interface for Efficient Heterogeneous Coherence," 2018 ACM/IEEE 45th Annual International Symposium on Computer Architecture, 2018, 14 pages.

Extended European Search Report issued in corresponding EP Application No. 25167711.8, dated Aug. 27, 2025 (12 pages).

* cited by examiner

SYSTEM AND METHOD FOR CACHE MANAGEMENT

CROSS-REFERENCE TO RELATED APPLICATION(S)

The present application claims priority to and the benefit of U.S. Provisional Application No. 63/650,775, filed May 22, 2024, entitled "WORD GRANULARITY CACHE COHERENCE FOR EFFICIENT FALSE SHARING", the entire content of which is incorporated herein by reference.

FIELD

One or more aspects of embodiments according to the present disclosure relate to computing systems, and more particularly to a cache manager.

BACKGROUND

In computing systems, caching may be used to improve performance. For example, a computing system may include an upper-level cache closest to a core of the computing system, and a lower-level cache, which may operate as the backing store for the upper-level cache, and which may use yet another, lower-level cache, or main memory, as its backing store. One or more of the caches may be shared, e.g., the lower-level cache may also operate as the backing store for an upper-level cache of another core of the system.

It is with respect to this general technical environment that aspects of the present disclosure are related.

SUMMARY

According to an embodiment of the present disclosure, there is provided a system, including: a lower-level cache; a first upper-level cache; and a second upper-level cache, the lower-level cache, the first upper-level cache, and the second upper-level cache being configured: to store first metadata of a cache line, in the first upper-level cache, the first metadata indicating that the cache line is in a partial state, the partial state indicating that at least two words in the cache line are in different permission states, the first metadata further indicating that a first word in the cache line is in a readable state or in a writable state in the first upper-level cache; to store second metadata of the cache line, in the second upper-level cache, the second metadata indicating that the cache line is in the partial state, the second metadata further indicating that a second word in the cache line is in a writable state in the second upper-level cache; and to store third metadata of the cache line, in the lower-level cache, the third metadata indicating that the cache line is in the partial state.

In some embodiments: the first metadata indicates that the first word in the cache line is in the readable state, the first metadata includes a read bit corresponding to the first word in the cache line, the read bit being set, and the first metadata includes a write bit corresponding to the first word in the cache line, the write bit being cleared.

In some embodiments: the first metadata indicates that the first word in the cache line is in a writable state, the first metadata includes a read bit corresponding to the first word in the cache line, the read bit being set, and the first metadata includes a write bit corresponding to the first word in the cache line, the write bit being set.

In some embodiments, the third metadata further includes a list of writers for the second word, the list of writers including the second upper-level cache.

In some embodiments: the first metadata indicates that the first word in the cache line is in the readable state, and the third metadata further includes a list of read-only upper-level caches for the cache line, the list of read-only upper-level caches including the first upper-level cache.

In some embodiments, the inclusion of the first upper-level cache in the list of read-only upper-level caches indicates that the first upper-level cache has read access to each word of the cache line that is not writable by another upper-level cache.

In some embodiments, the lower-level cache, the first upper-level cache, and the second upper-level cache are further configured to modify, in the second upper-level cache, a value of the second word in the cache line.

In some embodiments, the lower-level cache, the first upper-level cache, and the second upper-level cache are further configured to modify the second metadata to indicate that the second word in the cache line is in a modified state.

In some embodiments, the modifying of the second metadata includes clearing a read bit corresponding to the second word in the cache line and setting a write bit corresponding to the second word in the cache line.

In some embodiments, the first metadata further indicates that the second word in the cache line is in an invalid state in the first upper-level cache.

In some embodiments: the first metadata includes a read bit corresponding to the second word in the cache line, the read bit being cleared, and the first metadata includes a write bit corresponding to the second word in the cache line, the write bit being cleared.

In some embodiments, the lower-level cache is configured to store a copy of the second word.

In some embodiments, the third metadata is stored in a directory of the lower-level cache.

According to an embodiment of the present disclosure, there is provided a method, including: storing first metadata of a cache line, in a first upper-level cache, the first metadata indicating that the cache line is in a partial state, the partial state indicating that at least two words in the cache line are in different permission states, the first metadata further indicating that a first word in the cache line is in a readable state or in a writable state in the first upper-level cache; storing second metadata of the cache line, in a second upper-level cache, the second metadata indicating that the cache line is in the partial state, the second metadata further indicating that a second word in the cache line is in a writable state in the second upper-level cache; and storing third metadata of the cache line, in a lower-level cache, the third metadata indicating that the cache line is in the partial state.

In some embodiments: the first metadata indicates that the first word in the cache line is in the readable state, the first metadata includes a read bit corresponding to the first word in the cache line, the read bit being set, and the first metadata includes a write bit corresponding to the first word in the cache line, the write bit being cleared.

In some embodiments: the first metadata indicates that the first word in the cache line is in a writable state, the first metadata includes a read bit corresponding to the first word in the cache line, the read bit being set, and the first metadata includes a write bit corresponding to the first word in the cache line, the write bit being set.

In some embodiments, the third metadata further includes a list of writers for the second word, the list of writers including the second upper-level cache.

In some embodiments: the first metadata indicates that the first word in the cache line is in the readable state, and the third metadata further includes a list of read-only upper-level caches for the cache line, the list of read-only upper-level caches including the first upper-level cache.

In some embodiments, the inclusion of the first upper-level cache in the list of read-only upper-level caches indicates that the first upper-level cache has read access to each word of the cache line that is not writable by another upper-level cache.

According to an embodiment of the present disclosure, there is provided a method, including: receiving, from a first upper-level cache, a request for ownership, by a lower-level cache, for a data word at a first address, the first address being within a cache line, the cache line being in a shared state in the lower-level cache, the cache line having, in the lower-level cache, a set of read-only sharers including a second upper-level cache, the cache line being in a shared state in the second upper-level cache; invalidating the first address in the second upper-level cache; and preserving a read-only state, in the second upper-level cache, for a second address in the cache line, different from the first address.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for cache management provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
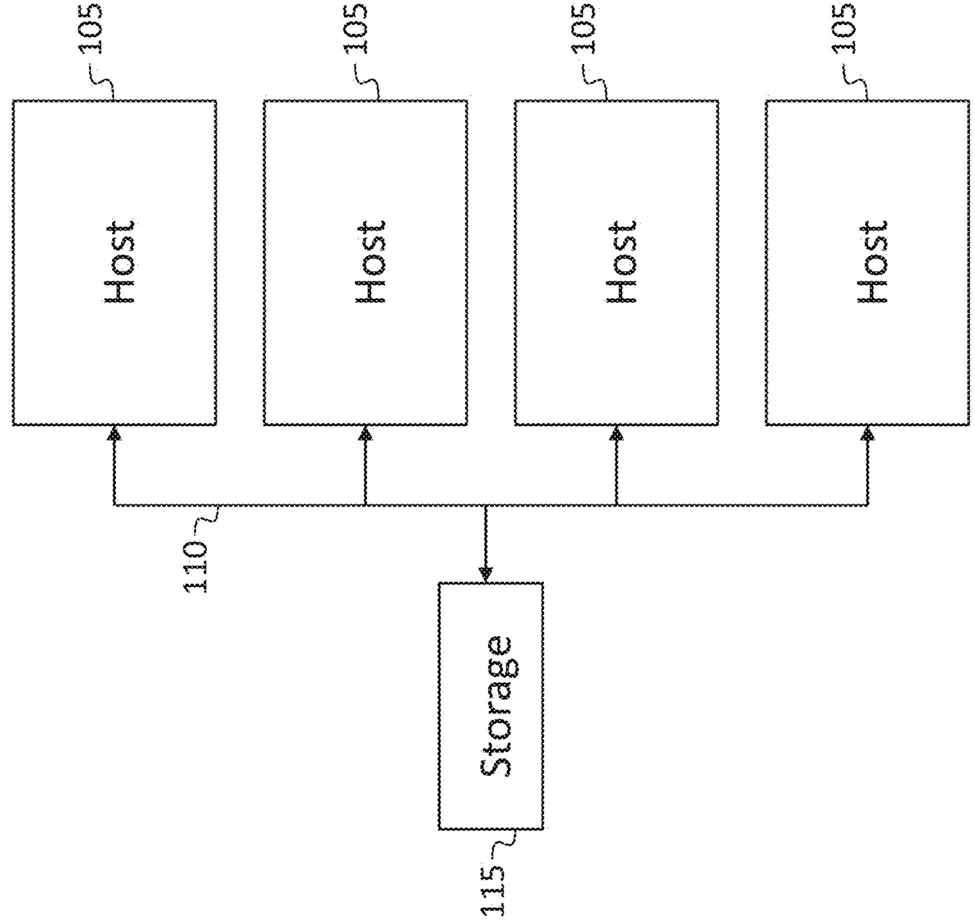
FIG. 1A is a block diagram of a computing system, according to an embodiment of the present disclosure.
Figure 1B:
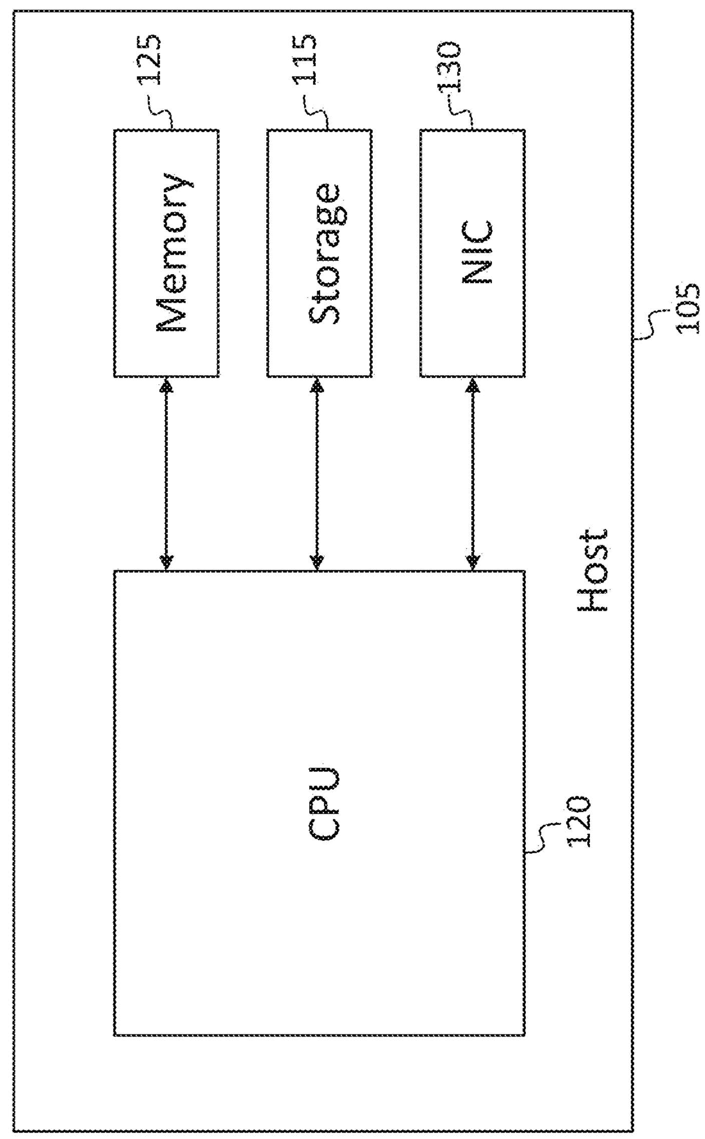
FIG. 1B is a block diagram of a host, according to an embodiment of the present disclosure.
Figure 1C:
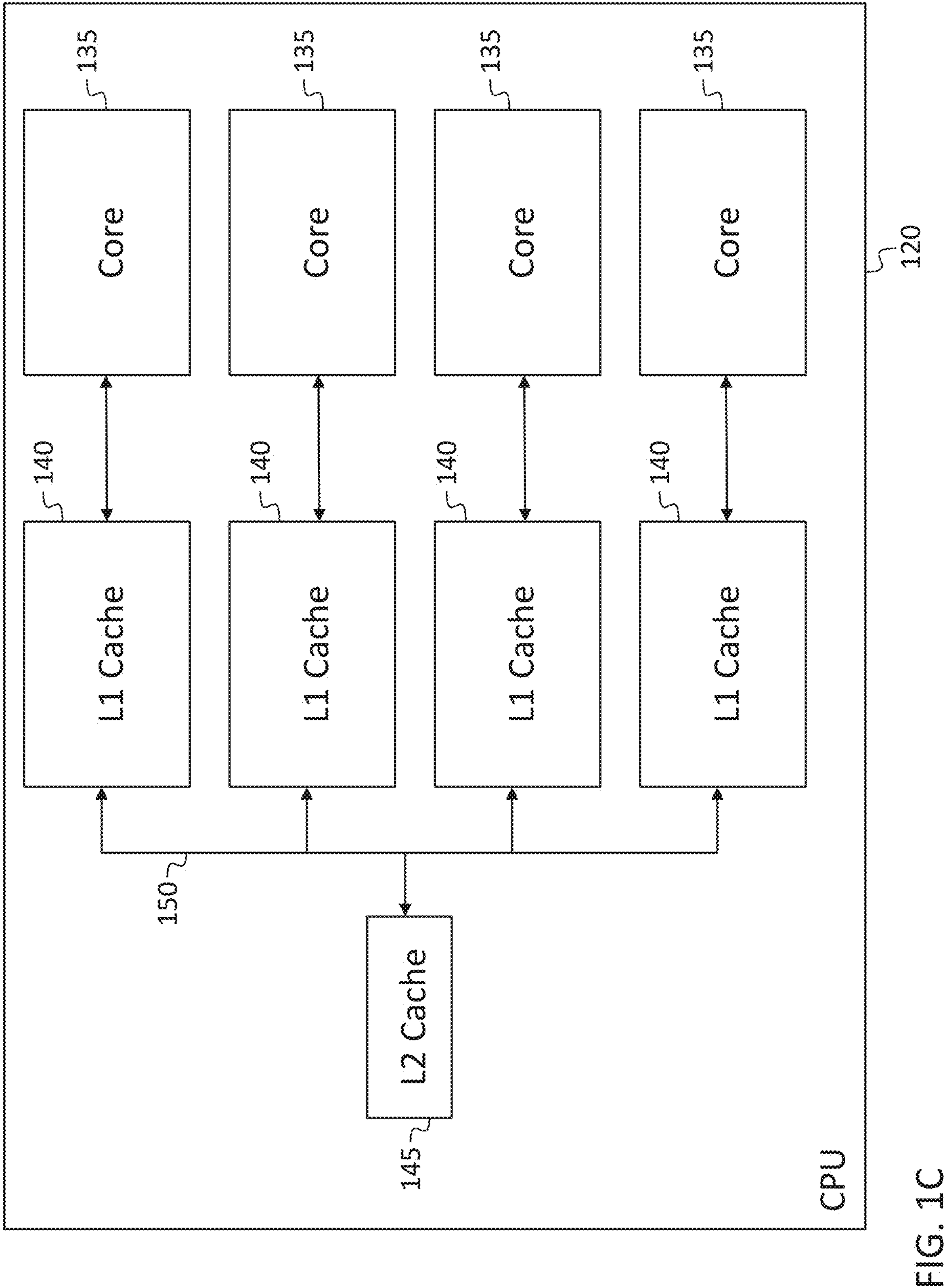
FIG. 1C is a block diagram of a central processing unit, according to an embodiment of the present disclosure.

FIG. 1A is a system level diagram of a computing system, in some embodiments. Each of a plurality of hosts 105 is connected, through a network 110, to the other hosts 105 of the computing system, and to shared resources such as persistent storage 115. FIG. 1B is a system level block diagram of a host 105 (or "node"), in some embodiments. A central processing unit 120 (which may be a processing circuit, and which may be fabricated on a single silicon chip) is connected to a main memory 125, persistent storage 115, and a network interface (e.g., a network interface card (NIC)) 130, for use as an interface to the network 110. The persistent storage 115 may be absent or may have limited capacity in an embodiment which includes external persistent storage 115, such as the embodiment illustrated in FIG. 1A. FIG. 1C is a block diagram of a CPU 120, in some embodiments. The CPU 120 includes a plurality of cores 135, each with a respective upper-level cache 140. The upper-level caches 140 share a lower-level cache 145. The components of the CPU 120 may be connected together by a network-on-chip (NoC) 150 as shown.

Data may be stored in cache and retrieved from cache in units that may be referred to as cache lines, or "blocks". Each cache line may include, e.g., 64 bytes, or more or fewer bytes. Each cache line may contain a plurality of words that may be individually accessed by core instructions. Each such word may be significantly smaller than a cache line, e.g., a word may have a length of four bytes.

If the caches and directories operate at cache line granularity, however, the handling of data in the larger unit of cache lines may result in inefficiencies. For example, some invalidation-based cache coherence schemes (such as a modified, exclusive, shared, invalid (MESI) cache coherence scheme, which uses these four states) may only allow one core to make modifications to a cache line at any time.

Such a scheme may also invalidate all read-only copies before granting write permission to a requester, and full ownership of an entire cache line may be transferred between the readers and writers on demand.

As such, some cache coherence schemes track modifications at a cache line granularity. In such a scheme, if one core 135 is writing any word of a cache line, no other cores 135 are permitted to read or write the other words in the cache line at the same time. Cores 135 that attempt to modify different words of a cache line (in a method that may be referred to as false sharing) may be required to snoop out and invalidate copies of the entire cache line in the caches of its peers.

Two cores continuously writing different words within a cache line may "ping-pong" cache line ownership (e.g., repeatedly transfer cache line ownership back and forth) between them. The process to migrate a cache block and manage permission incurs latency and is not necessary in cases of false sharing, but is necessitated by the use of a single coherence state for the entire cache line.

As such, some embodiments of the invention involve tracking writes and readability at a word granularity to alleviate the false sharing problem in a directory-based hardware cache coherent node. The tracking of writability and readability at word granularity may make it possible for multiple cores (e.g., for the upper-level caches of multiple cores) to efficiently access individual words in a cache line that is maintained, with different permission states for different words, in multiple upper-level caches.

In some embodiments, this is accomplished by augmenting the modified, exclusive, shared, invalid (MESI) cache coherence scheme with a "P" state which may indicate partial read/write permission. When a cache line is in the partial (P) state, additional bits of metadata may be used to indicate the state of the words in the cache line. For example, two bits of metadata may be used for this purpose, for each word in the cache line in the highest level of cache, e.g., the level closest to the core 135.

A first bit of these two bits, which may be referred to as a read bit, may be used to indicate whether the word is valid to read from that location (this bit may also indicate, when a word is writable, whether it has been modified). The second bit of these two bits, which may be referred to as a write bit, may be used to indicate whether the word is writable. These bits may be ignored if the line is in any of the modify, exclusive, shared (or "read-only"), or invalid states, with the exception that the write bits may be updated while the cache line is in the M state.

When the cache line is in the partial (P) state, the lower-level cache tracks which upper-level caches have write permission for each word. For example, the lower-level cache may maintain a list of writers for each word in the cache line. Cache inclusivity may be used (e.g., the lower-level cache may maintain a copy of the data stored in an upper-level cache) for any cache line with multiple writers. Network-on-chip (NoC) transactions may carry word addresses and word enables to support this functionality.

In such a system, if one upper-level cache has a cache line in the shared state and another upper-level cache attempts to write a sequence of words, performance may be degraded because each store operation (performed by a core 135, and resulting in a request for ownership transaction being sent to the higher-level cache by the upper-level cache) may generate a new request for ownership transaction to write that (previously unwritten) word.

As such, it may be advantageous to distinguish between (i) an operation to perform a transition from shared to partial and (ii) an invalidation, allowing the writer (the upper-level cache seeking to write data) to transition the entire cache line to the modified state.

In the read case, if the cache line is held in the modified (M) state and a core 135 performs a read of an unmodified word, it receives read access to all unwritten words (in the partial (P) state). If the core 135 requests a written word, the writer's copy is invalidated, the modified data is merged into the next lower level of cache, and the cache line may transition to the shared state if there are no other writers.

In other words, a read transaction may always result in the reader obtaining permission to read all words not held as writable in other caches. In contrast, a request for ownership may only result in the writer obtaining permission one word at a time if the cache line is held in the shared state or in the modified state in other caches.

In some embodiments, if a core 135 attempts to write two contiguous words (e.g., if the upper-level cache of the core 135 attempts to write two contiguous words), the lower-level cache may assume that the upper-level cache of the core 135 will continue to write more words, and may therefore transition the entire cache line to the modified state, and invalidate the sharers.

The determination made by the lower-level cache and the action taken by the lower-level cache may also be dependent on the location of the words in the cache line. If a first request is in-flight, it may be possible to merge requests and transition directly to the modified state without transitioning through the partial state. Two separate writes to contiguous words may cause a transition to the M state, regardless of the size of the individual writes, as long as they remain within a single cache line. For example, eight-byte writes may work like four-byte writes, in the case of independent requests.

In some embodiments, more complex heuristics and schemes may be employed, such as methods for predicting what addresses are likely to be read or written. In some embodiments, different heuristics are used per cache line or per set of cache lines.

In some embodiments, the lower-level cache will only cause an upper-level cache to transition to the partial (P) state if another upper-level cache has the cache line in the shared(S) state or in the modified (M) state.

Transitioning from shared(S) state to the partial (P) state may occur when one or more read-only sharers have the cache line in the shared(S) state, and a core attempts a write.

Transitioning from the modified (M) state to the partial (P) state may occur when a cache has the cache line in the modified (M) state and a reader or writer requests a word that was not written. In this case, the write bits may be updated even when the entire cache line is in the modified state to determine which words have been written. The lower-level cache may send a snoop to the upper-level cache that has the cache line in the modified state, specifying which words it needs in the modify or exclusive state. According to its current state and the received transaction, the upper-level cache controller may update its state and respond to the lower-level cache accordingly. The receiver of the snoop may determine whether to flush its copy or transition to P. In this situation, the behavior of the receiver of the snoop may be configurable.

Transitioning from partial (P) state to the modified (M) state may occur when a core 135 writes contiguous words with other sharers. This may operate as a part of the mitigation of the above-mentioned performance degradation.

Transitioning from partial (P) state to the modified (M) state may also occur when a core 135 issues a store instruction to a word that another cache has written and there are no other writers or sharers. In this situation, one of two options may be used. In a first option, if the first cache does not have any other words written, it may flush and give the cache line to the new writer in the modified state. In a second option, the first cache may be left in the partial state and writability may be removed only for the word for which the core 135 issued a store instruction. The selection of an option from among these two options may be controlled by configuration.

Transitioning from partial (P) state to the shared(S) state may also occur when a core 135 requests read access to a word that is marked as written in another cache and no other cache has the write bit set for any other word in the cache line. If the writer has other words written (e.g., if it has the write bit set for other words in the cache line) then one of two options may be used. In a first option, the writer may opt to release writability of only the requested word, and keep the cache line in P, allowing readability of all non-written words. In a second option, the writer may write-back the data and invalidate its copy.

If the requested word is not marked as written, the writer may keep the cache line in the partial state, and the reader may be granted access to all non-written words in the partial state.

If multiple writers have the cache line in the partial state, then the lower-level cache, which knows which upper-level caches have the write bit set for the word, may send probes to only those caches. The reader may then get the cache line in the partial state if other written words remain.

Specific rules to transition into and out of the partial state may vary. Different cache lines or cache sets may use different criteria for transitions. This disclosure does not prescribe any specific conditions, but provides the above-described conditions as examples only.

In some embodiments, hybrid cache inclusivity is employed, e.g., some write data may be merged at the next lower cache level. If there is only one writer of a cache line, then the lower-level cache need not hold a copy, and the writer has the complete cache line. If there are multiple writers (e.g., if no writer has the entire cache line in the exclusive or modified state), then the lower level may hold a copy for merging.

In some embodiments, word-granularity tracking is hierarchical. Each lower cache level (further from the cores) tracks the sharers and writers of words of the cache line in the next upper-level cache (nearer the core 135).

For example, the L3 cache may track which L2 caches have the cache line shared and which have write permissions for specific words. The lower-level cache (e.g., L3) may maintain a list of readers (read-only sharers), for the entire cache line, excluding any words for which an upper-level cache has write permission. The readers may be indicated using one bit for each of the upper-level caches. The lower-level cache may also track which upper-level caches have write permissions to each of the words in the cache line. This permission may be tracked with a single field identifying an upper-level cache for each word of the cache line.

Word granularity may be a design-time decision. The granularity may be as small as 1 byte (to match the smallest write size), or the granularity may be as large as one-half of a cache line. The granularity may be selected based on trading off false sharing efficiency against cache overhead. The optimal granularity may be four bytes or eight bytes to match the most common load and store instruction sizes. False sharing may be performed within a word, but this may result in reversion to normal MESI efficiency.

Some embodiments may use a network on chip (NoC) that supports transactions with a granularity that is smaller than a cache line.

Figure 2A:
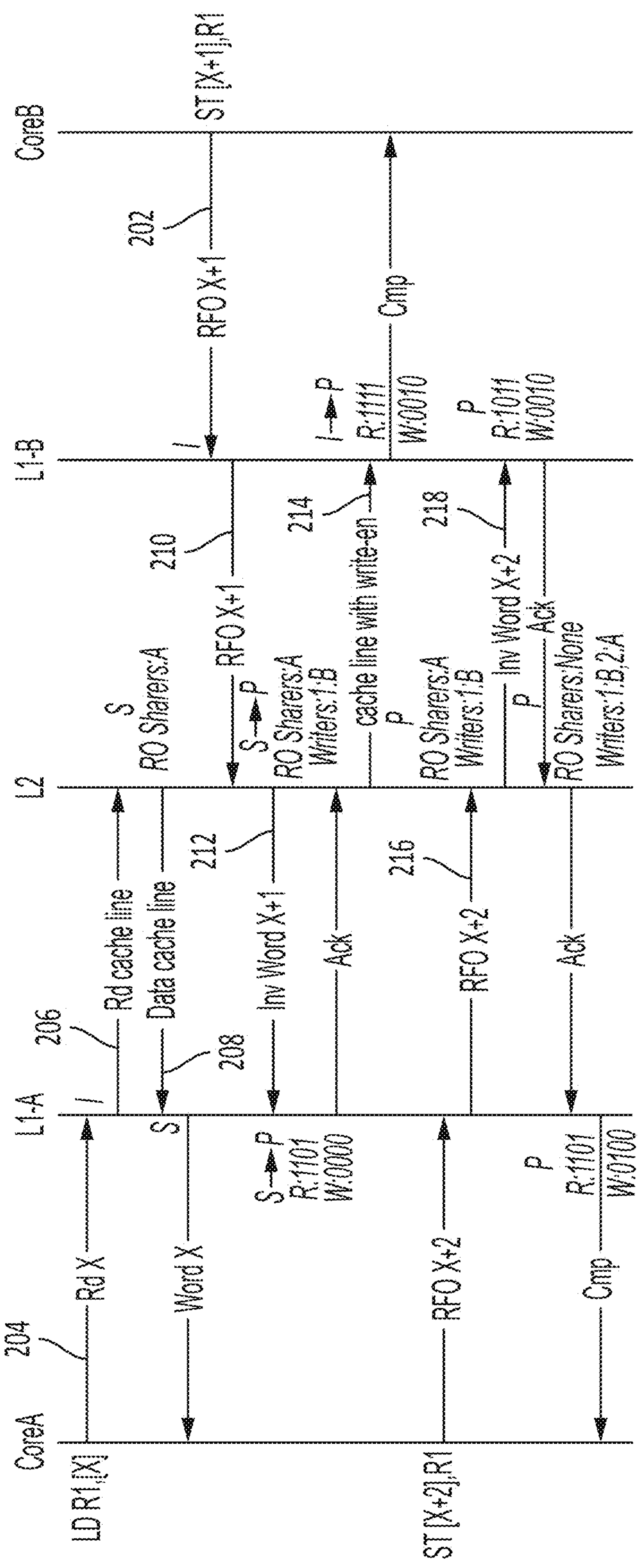
FIG. 2A is a cache operation sequence diagram, according to an embodiment of the present disclosure.

FIG. 2A illustrates the operation of word-granularity cache coherence, in one example. In FIG. 2A, a first core 135 (core B) performs a store (ST) instruction and, as a result issues, at 202, a request for ownership (RFO) transaction to a first address (address X+1).

This address (X+1) is in the same cache line as a second address (address X) to which a second core (core A) previously issued, at 204, a read (Rd) transaction (as a result of executing a load (LD) instruction). The issuing of the corresponding read transaction by the second core resulted in a cache miss (when the second upper-level cache (L1-A) determined that the cache line containing address X was in the invalid (I) state), which caused the second upper-level cache to send a transaction, at 206, to the lower-level cache (L2). In response, the lower-level cache (i) sent, at 208, a transaction containing the cache line at address X to the second upper-level cache, set the state, in the lower-level cache, of the cache line, to shared, and added the second upper-level cache to the list of read only sharers (RO sharers) for the cache line. The state of this cache line in the second upper-level cache changed to shared(S) as a result of receiving the transaction sent at 208.

In FIG. 2A (and in FIGS. 2B and 2C), state indicators that are next to the vertical line represent cache state information maintained in that cache.

The sending, at 202, of the request for ownership (RFO) transaction by the first core results in a cache miss in the first upper-level cache and the sending, at 210, of a request for ownership (RFO) transaction from the first upper-level cache to the lower-level cache. The lower-level cache then changes the state, in the lower-level cache, of the cache line to the partial state, and adds the first upper-level cache to a list of writers, maintained by the lower-level cache for the cache line, with the first upper-level cache being identified in the list as a writer only of the word at address X+1. This is shown, in FIG. 2A, using the notation "Writers: 1:B" which indicates that the first upper-level cache (cache L1-B) is a writer of word 1 of the cache line (where the word at address X+n is the $n^{th}$ word of the cache line).

The lower-level cache then sends, at 212, a transaction to the second upper-level cache invalidating the first address (i.e., the address X+1) in the second upper-level cache, and the second upper-level cache replies with an acknowledgement (Ack). The effect of the invalidating of the first address in the second upper-level cache is (i) transitioning the cache line, in the second upper-level cache, from a shared(S) state to a partial (P) state, (ii) clearing (e.g., setting to 0), in the second upper-level cache, a read bit corresponding to the first address (X+1) (so that the vector of read bits becomes 1101 as shown), and (iii) clearing, in the second upper-level cache, a write bit vector corresponding to each of the words in the cache line (so that the vector of write bits is 0000 as shown).

The shared state which the cache line was in in the second upper-level cache prior to the receipt of the transaction sent at 212 may be considered to be equivalent to a partial state in which the vector of read bits is 1111 and the vector of write bits is 0000. This may therefore be the initial state from which the clearing of the read bit and the clearing of the write bit to 1 is performed.

As used herein, "setting" a bit means (i) changing its value to 1 (or leaving its value at 1 if it is already 1) or (ii) changing its value to 0 (or leaving its value at 0 if it is already 0), and "clearing" a bit means the opposite of setting a bit (e.g., if setting a bit means changing its value to 1 (or leaving its value at 1 if it is already 1) then clearing a bit means changing its value to 0 (or leaving its value at 0 if it is already 0). Examples in the present disclosure treat "setting" a bit as meaning changing its value to 1 (or leaving its value at 1 if it is already 1), and "clearing" a bit as meaning changing its value to 0 (or leaving its value at 0 if it is already 0)).

In response to receiving the acknowledgement (Ack), the lower-level cache may, at 214, send a cache line with write enable transaction to the first upper-level cache, which causes the first upper-level cache to set its vector of read bits to 1111 and to set its vector of write bits to 0010 (indicating that the first upper-level cache has permission to write word 1 and permission to read all of the words of the cache line).

The second core then executes a store (ST) instruction at a third address (address X+2), resulting in the sending, at 216, of a request for ownership (RFO) transaction for the word at address X+2. This causes the lower-level cache to invalidate, at 218, the word at address X+2 in the first upper-level cache. The effect of the invalidating of the third address in the first upper-level cache is (i) clearing, in the first upper-level cache, a read bit of the third address (so that the vector of read bits becomes 1011 as shown), and clearing, in the first upper-level cache, a write bit of the third address (so that the vector of write bits is 0010 as shown). An acknowledgment is then sent by the first upper-level cache to the lower-level cache and an acknowledgement is sent by the lower-level cache to the second upper-level cache, causing the second upper-level cache to set the write bit of the second word, so that the vector of write bits in the second upper-level cache is 0100.

Figure 2B:
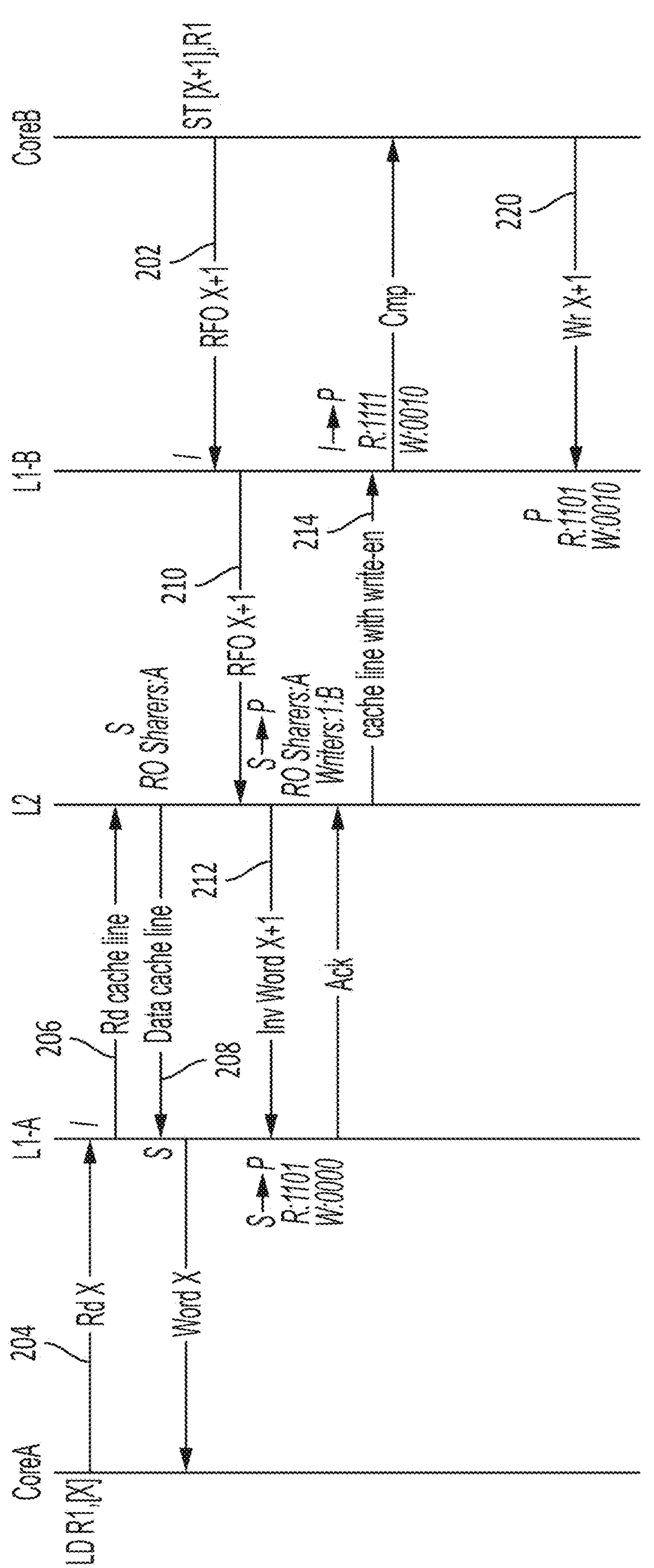
FIG. 2B is a cache operation sequence diagram, according to an embodiment of the present disclosure.

FIG. 2B shows an example similar to that of FIG. 2A except that instead of the second core performing a store instruction, the first core writes, at 220, a new value for the first word to the first upper-level cache. This causes the first upper-level cache to set the first bit of the vector of read bits to 0, indicating that the first word has been modified in the first upper-level cache. The examples of FIGS. 2A and 2B illustrate that the four possible combinations of read bit value and write bit value correspond to states as follows: (i) the read bit having value 1 and the write bit having value 0 corresponds to a shared state, (ii) the read bit having value 0 and the write bit having value 0 corresponds to an invalid state, (iii) the read bit having value 1 and the write bit having value 1 corresponds to an exclusive state, and (iv) the read bit having 0 and the write bit having value 1 corresponds to a modified state. As used herein, a "writable" state is either the exclusive state or the modified state, and the "readable" state is the shared state.

Figure 2C:
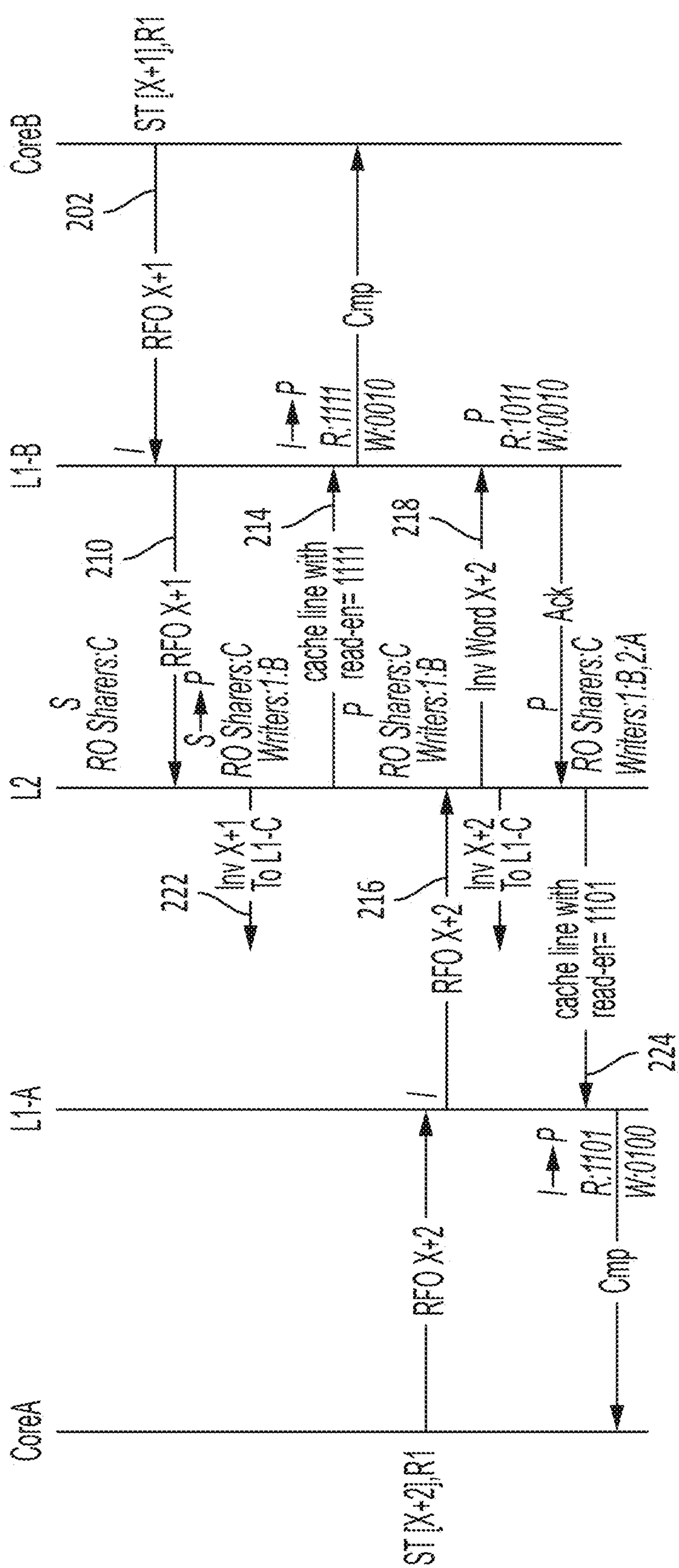
FIG. 2C is a cache operation sequence diagram, according to an embodiment of the present disclosure.

FIG. 2C shows an example similar to that of FIG. 2A except that the second core does not perform a read instruction initially (as it does, at 204, in the example of FIG. 2A), and the cache line is in the shared state in the lower-level cache initially as a result of the actions of a third upper-level cache (L1-C), not shown. In this example, the lower-level cache sends, at 222, an invalidate transaction to the third upper-level cache, and, after the lower-level cache invalidating, at 218, the word at address X+2 in the first upper-level cache and receiving an acknowledgement, the lower-level cache sends, at 224, to the second upper-level cache, a cache line with a vector of read bits (1101, "read-en" in FIG. 2C), causing the second upper-level cache to use the received vector of read bits and to set its vector of read bits to 1101. The lower-level cache sends the vector of read bits to the second upper-level cache, because absent such sending, the second upper-level cache would not know for which words it had read permission. In this example, each of the upper-level caches assume that its vector of write bits is cleared except for any words for which it sent a request for ownership.

Figure 3:
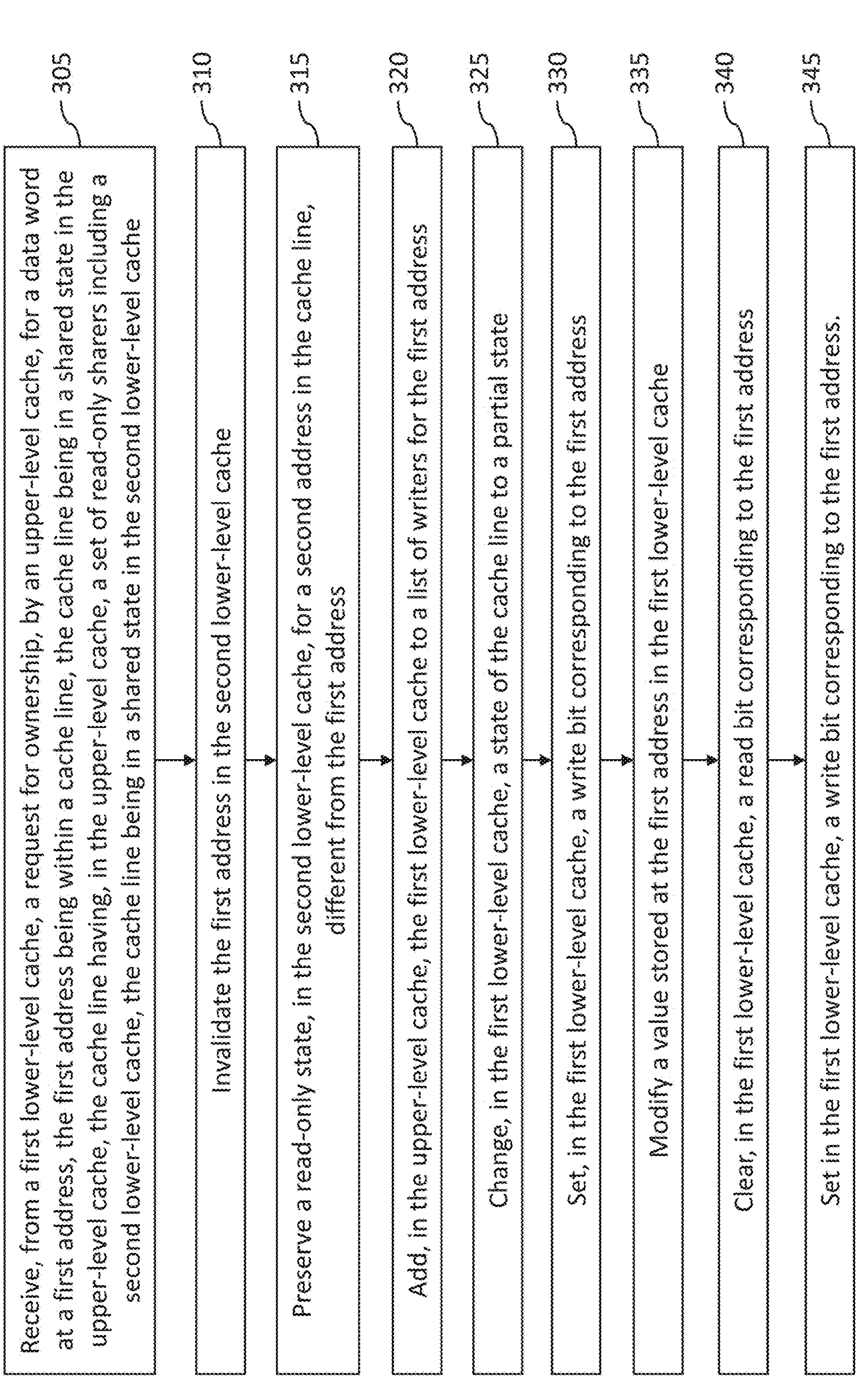
FIG. 3 is a flow chart, according to an embodiment of the present disclosure.

FIG. 3 shows a method of cache management, in some embodiments. Although FIG. 3 illustrates various operations in such a method, embodiments according to the present disclosure are not limited thereto. For example, according to some embodiments, such a method may include additional operations or fewer operations, or the order of operations may vary (unless otherwise explicitly stated or implied) without departing from the spirit and scope of embodiments according to the present disclosure.

The method includes receiving, at 305, from a first upper-level cache, a request for ownership, by a lower-level cache, for a data word at a first address, the first address being within a cache line, the cache line being in a shared state in the lower-level cache, the cache line having, in the lower-level cache, a set of read-only sharers including a second upper-level cache, the cache line being in a shared state in the second upper-level cache.

The method further includes invalidating, at 310, the first address in the second upper-level cache; and preserving, at 315, a read-only state, in the second upper-level cache, for a second address in the cache line, different from the first address.

The invalidating of the first address in the second upper-level cache may include changing a state of the cache line, in the second upper-level cache, to a partial state, clearing, in the second upper-level cache, a read bit corresponding to the first address, and clearing, in the second upper-level cache, a write bit corresponding to the first address.

The preserving of a read-only state, in the second upper-level cache, for the second address may include leaving unchanged, in the second upper-level cache, a read bit corresponding to the second address.

The method further includes adding, at 320, in the lower-level cache, the first upper-level cache to a list of writers for the first address, changing, at 325, in the first upper-level cache, a state of the cache line to a partial state, and setting, at 330, in the first upper-level cache, a write bit corresponding to the first address.

The method further includes modifying, at 335, a value stored at the first address in the first upper-level cache.

The method further includes clearing, at 340, in the first upper-level cache, a read bit corresponding to the first address, and setting, at 345, in the first upper-level cache, a write bit corresponding to the first address.

Figure 4:
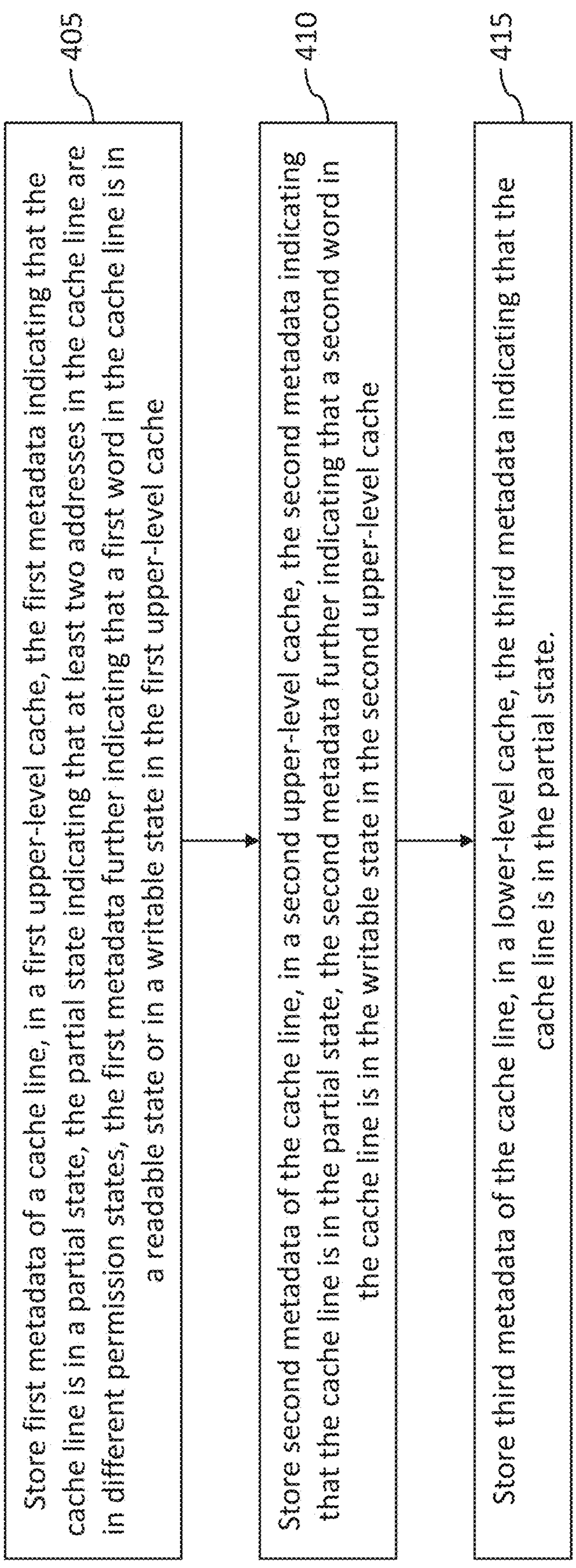
FIG. 4 is a flow chart, according to an embodiment of the present disclosure.

FIG. 4 shows a method of cache management, in some embodiments. Although FIG. 4 illustrates various operations in such a method, embodiments according to the present disclosure are not limited thereto. For example, according to some embodiments, such a method may include additional operations or fewer operations, or the order of operations may vary (unless otherwise explicitly stated or implied) without departing from the spirit and scope of embodiments according to the present disclosure.

The method includes: storing, at 405, first metadata of a cache line, in the first upper-level cache, the first metadata indicating that the cache line is in a partial state, the partial state indicating that at least two words in the cache line are in different permission states, the first metadata further indicating that a first word in the cache line is in a readable state or in a writable state in the first upper-level cache. For example, as illustrated in FIG. 2A, after the lower-level cache sends, at 214, a cache line with write enable transaction to the first upper-level cache, which causes the first upper-level cache to set its vector of read bits to 1111 and to set its vector of write bits to 0010 (indicating that the first upper-level cache has permission to write word 1 and permission to read all of the words of the cache line), a first word of the of first upper-level cache (the word at X+1) is in a writable permission state (the exclusive state), and each of the other words is in a different permission state (the shared state).

The method further includes storing, at 410, second metadata of the cache line, in the second upper-level cache, the second metadata indicating that the cache line is in the partial state, the second metadata further indicating that a second word in the cache line is in a writable state in the second upper-level cache, For example, as illustrated in FIG. 2A, the second upper-level cache transitions to a partial state in which the word at address X+2 (which may be referred to as a second word) is in a writable state (e.g., in the exclusive state), and the word at X+1 is in an invalid state. The method further includes storing, at 415, third metadata of the cache line, in the lower-level cache, the third metadata indicating that the cache line is in the partial state. For example, as illustrated in FIG. 2A, the lower-level cache transitions to a partial state.

In some embodiments, the first metadata indicates that the first word in the cache line is in the readable state, the first metadata includes a read bit corresponding to the first word in the cache line, the read bit being set, and the first metadata includes a write bit corresponding to the first word in the cache line, the write bit being cleared. This is illustrated, for example, by the respective bit settings in the first upper-level cache, in FIG. 2A, for the word at address X, which is in the shared state.

In some embodiments, the first metadata instead indicates that the first word in the cache line is in a writable state, the first metadata includes a read bit corresponding to the first word in the cache line, the read bit being set, and the first metadata includes a write bit corresponding to the first word in the cache line, the write bit being set. This is illustrated, for example, by the respective bit settings in the first upper-level cache, in FIG. 2A, for the word at address X+1, which is in a writeable state (the exclusive state).

In some embodiments, the third metadata further includes a list of writers for the second word, the list of writers including the second upper-level cache. For example, as illustrated in FIG. 2A, the list of writers may include "2: A", which may mean that the word at address X+2 has writer L1-A (the second upper-level cache, cache L1-A, abbreviated, in the list of read-only sharers of FIG. 2A as "A"). In some embodiments, the first metadata indicates that a first word in the cache line is in the readable state, and the third metadata further includes a list of read-only upper-level caches for the cache line, the list of read-only upper-level caches including the first upper-level cache (in an embodiment in which the first upper-level cache has read-only access). The inclusion of the second upper-level cache in the list of read-only upper-level caches may indicate that the second upper-level cache has read access to each word of the cache line that is not writable by another upper-level cache.

In some embodiments, e.g., if multiple upper-level caches have modify access to different words in a cache line, the lower-level cache may, (e.g., upon eviction of the cache line, or flushing of the cache line to memory) merge the modified words into a single modified cache line. To make this possible, the lower-level cache may store a copy of each modified word. In some embodiments, the metadata of the lower-level cache is stored in a directory. In other embodiments, the metadata of the lower-level cache is stored along with the copies of data from upper-level caches.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all upper numerical limitations subsumed therein and any minimum numerical limitation recited in this specification is intended to include all higher numerical limitations subsumed therein.

Although exemplary embodiments of a system and method for cache management have been specifically described and illustrated herein, many modifications and variations will be apparent to those skilled in the art. Accordingly, it is to be understood that a system and method for cache management constructed according to principles of this disclosure may be embodied other than as specifically described herein. The invention is also defined in the following claims, and equivalents thereof.

What is claimed is:

1. A method, comprising:

storing first metadata of a cache line, in a first upper-level cache, the first metadata indicating that the cache line is in a partial state, the partial state indicating that at least two words in the cache line are in different permission states, a size of at least one of the at least two words being smaller than a size of the cache line, the first metadata further indicating that a first word in the cache line is in a readable state or in a writable state in the first upper-level cache;

storing second metadata of the cache line, in a second upper-level cache, the second metadata indicating that the cache line is in the partial state, the second metadata further indicating that a second word in the cache line is in a writable state in the second upper-level cache; and storing third metadata of the cache line, in a lower-level cache, the third metadata indicating that the cache line is in the partial state.

2. The method of claim 1, wherein:

the first metadata indicates that the first word in the cache line is in the readable state, the first metadata includes a read bit corresponding to the first word in the cache line, the read bit being set, and the first metadata includes a write bit corresponding to the first word in the cache line, the write bit being cleared.

3. The method of claim 1, wherein:

the first metadata indicates that the first word in the cache line is in a writable state, the first metadata includes a read bit corresponding to the first word in the cache line, the read bit being set, and the first metadata includes a write bit corresponding to the first word in the cache line, the write bit being set.

4. The method of claim 1, wherein the third metadata further includes a list of writers for the second word, the list of writers including the second upper-level cache.

5. The method of claim 4 wherein the inclusion of the first upper-level cache in the list of read-only upper-level caches indicates that the first upper-level cache has read access to each word of the cache line that is not writable by another upper-level cache.

6. The method of claim 1, wherein:

the first metadata indicates that the first word in the cache line is in the readable state, and the third metadata further includes a list of read-only upper-level caches for the cache line, the list of read-only upper-level caches including the first upper-level cache.

7. A method, comprising:

receiving, from a first upper-level cache, a request for ownership, by a lower-level cache, for a data word at a first address, the first address being within a cache line, a size of the data word being smaller than a size of the cache line, the cache line being in a shared state in the lower-level cache, the cache line having, in the lower-level cache, a set of read-only sharers including a second upper-level cache, the cache line being in a shared state in the second upper-level cache;

invalidating the first address in the second upper-level cache; and preserving a read-only state, in the second upper-level cache, for a second address in the cache line, different from the first address.

8. A system, comprising:

a lower-level cache;

a first upper-level cache; and a second upper-level cache, the lower-level cache, the first upper-level cache, and the second upper-level cache being configured:

to store first metadata of a cache line, in the first upper-level cache, the first metadata indicating that the cache line is in a partial state, the partial state indicating that at least two words in the cache line are in different permission states, a size of at least one of the at least two words being smaller than a size of the cache line, the first metadata further indicating that a first word in the cache line is in a readable state or in a writable state in the first upper-level cache;

to store second metadata of the cache line, in the second upper-level cache, the second metadata indicating that the cache line is in the partial state, the second metadata further indicating that a second word in the cache line is in a writable state in the second upper-level cache; and to store third metadata of the cache line, in the lower-level cache, the third metadata indicating that the cache line is in the partial state.

9. The system of claim 8, wherein:

the first metadata indicates that the first word in the cache line is in the readable state, the first metadata includes a read bit corresponding to the first word in the cache line, the read bit being set, and the first metadata includes a write bit corresponding to the first word in the cache line, the write bit being cleared.

10. The system of claim 8, wherein:

the first metadata indicates that the first word in the cache line is in a writable state, the first metadata includes a read bit corresponding to the first word in the cache line, the read bit being set, and the first metadata includes a write bit corresponding to the first word in the cache line, the write bit being set.

11. The system of claim 8, wherein the third metadata further includes a list of writers for the second word, the list of writers including the second upper-level cache.

12. The system of claim 11 wherein the inclusion of the first upper-level cache in the list of read-only upper-level caches indicates that the first upper-level cache has read access to each word of the cache line that is not writable by another upper-level cache.

13. The system of claim 8, wherein:

the first metadata indicates that the first word in the cache line is in the readable state, and the third metadata further includes a list of read-only upper-level caches for the cache line, the list of read-only upper-level caches including the first upper-level cache.

14. The system of claim 8, wherein the lower-level cache, the first upper-level cache, and the second upper-level cache are further configured to modify, in the second upper-level cache, a value of the second word in the cache line.

15. The system of claim 14, wherein the lower-level cache, the first upper-level cache, and the second upper-level cache are further configured to modify the second metadata to indicate that the second word in the cache line is in a modified state.

16. The system of claim 15, wherein the modifying of the second metadata comprises clearing a read bit corresponding to the second word in the cache line and setting a write bit corresponding to the second word in the cache line.

17. The system of claim 8 wherein the first metadata further indicates that the second word in the cache line is in an invalid state in the first upper-level cache.

18. The system of claim 17, wherein:

the first metadata includes a read bit corresponding to the second word in the cache line, the read bit being cleared, and the first metadata includes a write bit corresponding to the second word in the cache line, the write bit being cleared.

19. The system of claim 8, wherein the lower-level cache is configured to store a copy of the second word.

20. The system of claim 8, wherein the third metadata is stored in a directory of the lower-level cache.

* * * * *